H. W. HESCOCK.
EVAPORATING PANS.
No. 195,366. Patented Sept. 18, 1877.
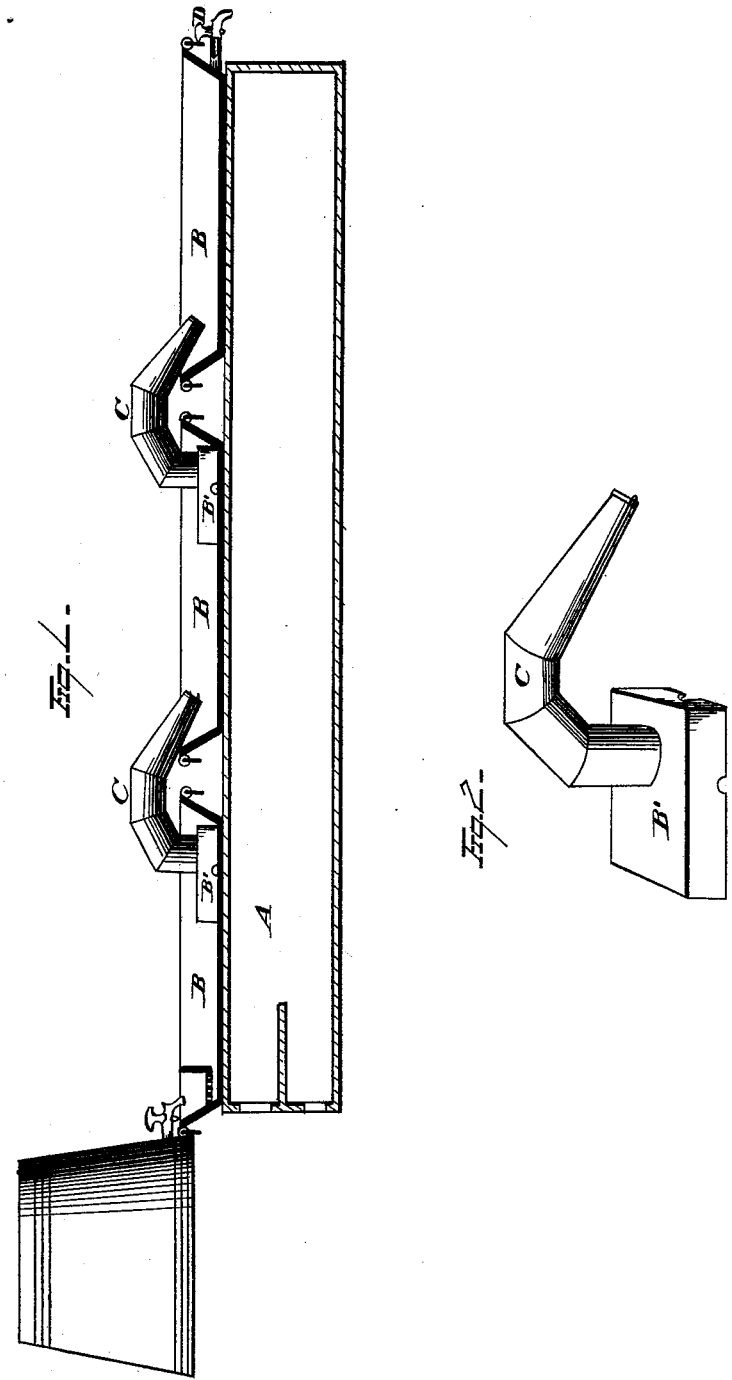
WITNESSES
Ed. S. Nottingham
A. W. Bright
INVENTOR
Henry W. Hescock
By Leggett and Leggett
ATTORNEYS

UNITED STATES PATENT OFFICE.

HENRY W. HESCOCK, OF HUBBARD, OHIO.

IMPROVEMENT IN EVAPORATING-PANS.

Specification forming part of Letters Patent No. 195,366, dated September 18, 1877; application filed August 13, 1877.

*To all whom it may concern:*

Be it known that I, HENRY W. HESCOCK, of Hubbard, in the county of Trumbull and State of Ohio, have invented certain new and useful Improvements in Evaporating-Pans; and I do hereby declare the following to be a full, clear, and exact description of the invention, such as will enable others skilled in the art to which it pertains to make and use it, reference being had to the accompanying drawings, which form part of this specification.

My invention relates to evaporating-pans for the manufacture of saccharine sirups and the like; and consists in a series of independent pans placed over a suitable furnace, said pans being connected by arched pipes or siphons extending from the bottom of one pan into its neighboring pan.

In the drawings, Figure 1 represents a longitudinal section of the evaporating apparatus embodying my invention; Fig. 2, a detached view of a pipe connecting two pans.

A is a furnace. B B are independent pans; C, pipes or siphons, connecting the pans to each other; D, a spigot, through which the finished product is drawn from the last pan.

The furnace A may be of any suitable construction or description; so likewise may the pans B be made of any suitable material, size, or shape. The pans B are placed over the furnace A in any suitable manner to obtain the best results, and are so placed that their top edges will nearly, or quite, touch each other. When in this position each pan is connected with its neighboring pan by a pipe or siphon, C. If the pipe is used, I prefer the construction shown in the drawing. Here the pipe rises through a raised chamber, B', the base of which is suitably perforated to allow the passage of the liquid, which, as it enters, is driven up by the action of heat or ebullition to the next succeeding pan. At the mouth of each pipe or siphon C is placed any suitable gage, for the purpose of preventing the liquid from passing too rapidly from one section to the other.

The main tank or reservoir, from whence the first pan B is supplied, has a sponge-filter or any other strainer at its outlet or faucet, that shall operate to clear the sap or juice of gross impurities.

The operation of my device is as follows: The first pan is supplied with a less amount of heat than the succeeding ones, and the degree of heat increases from this to the last pan. These pans are placed in suitable number, so that by the time the fluid has reached the last pan it is nearly finished, and ready to be drawn off for the market.

The advantages which arise from a construction such as shown herein are, first, purity of the finished product; second, a decreased liability to burning or scorching; third, cheapness of apparatus in original cost and repairs, as each pan is separate and independent, and, should one become accidentally destroyed or damaged, it can be readily replaced without cost or detriment to what remains; fourth, an increased radiating-surface.

What I claim is—

The combination, with independent evaporating-pans, of one or more siphons, each of which is secured to a perforated base, substantially as described.

In testimony whereof I have signed my name to this specification in the presence of two subscribing witnesses.

HENRY W. HESCOCK.

Witnesses:
JACOB HAUM, Jr.,
NATHANIEL MITCHELL.